(12) United States Patent
Pichaimurthy et al.

(10) Patent No.: US 12,316,461 B2
(45) Date of Patent: *May 27, 2025

(54) OPTIMIZED KERNEL FOR CONCURRENT STREAMING SESSIONS

(71) Applicant: Adeia Guides Inc., San Jose, CA (US)

(72) Inventors: Rajendran Pichaimurthy, Karnataka (IN); Dolphin Masilamany Santha, Karnataka (IN); Gyanveer Singh, Bangalore (IN); Prakash Viswanathan, Karnataka (IN)

(73) Assignee: ADEIA GUIDES INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,364

(22) Filed: Jul. 5, 2023

(65) Prior Publication Data

US 2024/0039663 A1 Feb. 1, 2024

Related U.S. Application Data

(63) Continuation of application No. 17/347,745, filed on Jun. 15, 2021, now Pat. No. 11,736,240, which is a
(Continued)

(51) Int. Cl.
*H04L 1/1829* (2023.01)
*H04L 1/1867* (2023.01)
*H04L 65/61* (2022.01)

(52) U.S. Cl.
CPC .......... *H04L 1/1832* (2013.01); *H04L 1/1838* (2013.01); *H04L 1/187* (2013.01); *H04L 1/1877* (2013.01); *H04L 65/61* (2022.05)

(58) Field of Classification Search
CPC ..... H04L 1/1832; H04L 1/1838; H04L 1/187; H04L 1/1877; H04L 65/61; H04L 65/612
See application file for complete search history.

(56) References Cited

U.S. PATENT DOCUMENTS

2002/0078135 A1    6/2002  Venkatsubra
2002/0129172 A1*   9/2002  Baskey .................. G06F 9/544
                                                            719/321
(Continued)

OTHER PUBLICATIONS

Context Switch Definition (2004) (http://www.linfo.org/context_switch.html) (3 pages).
(Continued)

*Primary Examiner* — Yaotang Wang
(74) *Attorney, Agent, or Firm* — HALEY GUILIANO LLP

(57) ABSTRACT

Systems and methods are described for streaming content to multiple devices from a shared sliding window buffer in kernel space, thereby reducing memory resource use and minimizing context/mode switching between kernel space and user space. For example, concurrent streaming sessions may be seen, e.g., as a live multimedia stream. If a live video is being transmitted as a multicast stream to many devices, rather than each device having a corresponding sliding window buffer in kernel space, each device will share a shared sliding buffer in kernel space. The sliding window buffer size will be at least large enough to stream the slowest connection speed and can be, e.g., multiple times as large as necessary, in case of the issues beyond the worst-case scenario. The system then transmits chunks of the content from the shared sliding window buffer to each of the plurality of client devices.

20 Claims, 6 Drawing Sheets

Related U.S. Application Data continuation of application No. 16/804,716, filed on Feb. 28, 2020, now Pat. No. 11,063,708.

(56) References Cited

U.S. PATENT DOCUMENTS

| | | |
|---|---|---|
| 2004/0098748 A1 | 5/2004 | Bo et al. |
| 2008/0144660 A1 | 6/2008 | Godlewski |
| 2009/0240874 A1 | 9/2009 | Pong |
| 2017/0164069 A1 | 6/2017 | Oh et al. |
| 2018/0076934 A1 | 3/2018 | Huitema et al. |
| 2018/0278664 A1 | 9/2018 | Chen et al. |
| 2020/0177311 A1 | 6/2020 | Ho et al. |
| 2021/0099391 A1* | 4/2021 | Masputra .............. H04L 47/805 |
| 2021/0314103 A1 | 10/2021 | Pichaimurthy et al. |

OTHER PUBLICATIONS

How Long Does a Context Switch Take?—Quora (2019) (https://www.quora.com/How-long-does-a-context-switch-lake) (3 pages).

\* cited by examiner

600

OPTIMIZED KERNEL FOR CONCURRENT STREAMING SESSIONS

CROSS REFERENCE TO RELATED APPLICATIONS

This application is a continuation of U.S. patent application Ser. No. 17/347,745, filed Jun. 15, 2021, which is a continuation of U.S. patent application Ser. No. 16/804,716, filed Feb. 28, 2020, now U.S. Pat. No. 11,063,708, the disclosures of which are hereby incorporated by reference herein in their entireties.

BACKGROUND

The present disclosure is directed to content delivery systems and, more particularly, to content delivery of a content stream to multiple devices.

SUMMARY

Content may be delivered via several mechanisms, each using hardware and network resources to different degrees. Content may be delivered to many users at one time. For example, content distribution protocols based on TCP (Transmission Control Protocol) connections, such as MPEG-DASH, HTTP Dynamic streaming, HTTP Live Streaming (HLS), or Smooth Streaming, may be used to deliver content to many devices at once. Delivering content streams concurrently to a plurality of devices uses a significant amount of system memory and processing power. Because these streams essentially require a copy of the content to be stored in buffered memory and sent to each device streaming the content, it is apparent that real-world hardware constraints on memory and performance, thousands (or millions) of viewers can rapidly cause network bottlenecks. Reducing the amount of replications of a data chunk during streaming transmission, as well as minimizing the burden on processor tasks of switching between contexts and modes, may improve system performance, as well as individual stream quality.

One of the most used connection-oriented and reliable protocols for streaming is HTTP, or other TCP-based protocols. These protocols rely on sockets as nodes in a network that are each addressable for communication using addresses, such as IP addresses and port numbers. Streaming sockets are a commonly used type of communication transport protocol over TCP/IP. TCP sockets provide a reliable data pipeline between two endpoints, with minimal errors, where both ends can send and receive streams of data back and forth, generally without loss or duplication.

With TCP-based protocols, the two endpoints open a connection, the file data is written by one end into the connection and read by the other end, and the connection-orientation and reliability ensure that the file will be received correctly. TCP is one of the core protocols of the Internet Protocol suite (IP) described in RFC 675 and RFC 793, and the entire suite is often referred to as TCP/IP. HTTP, HTTPS, SMTP, POP3, IMAP, SSH, FTP, Telnet and a variety of other protocols are encapsulated in TCP. As the transport layer of TCP/IP suite, the TCP provides a communication service at an intermediate level between an application program and the Internet Protocol (IP).

TCP automatically uses a sliding windows algorithm to achieve throughput relatively close to the maximum available. Sliding window protocol is a flow control technique for data transmission that facilitates sending and receiving frames in imperfect sequence. Rather than wait for an acknowledgment from a receiver for each packet transmitted before sending the next packet, a select number (e.g., a window) of sequenced packets are sent and the acknowledgment signal replies back with each sequence number. By recording which packets have been acknowledged as received and then sending more packets, the packet window slides along the stream of packets making up the transfer. Sliding windows, and network data generally, may be stored in a portion of a computer's memory that is set aside as a temporary holding place for data that is being sent to or received, e.g., a buffer.

Opening a TCP socket generally requires a client to request, via a client application, the opening of a socket by a server, and the server, via a server application, accepting. Generally, a client and a server may be any device on a network, but the device requesting establishment of the socket is usually referred to as the client. Both a client and a server may send or receive data via the socket, but, as a non-limiting example, with content delivery systems, a content server transmitting concurrent streams is often a server with many open sockets each connecting to one of many clients.

To open sockets and communicate via sockets, a server typically uses one or more applications. Such applications functioning, e.g., in a content delivery server, must cause the performance of tasks in two different reserved parts of memory: user space and kernel space. Kernel space is strictly reserved for running a privileged operating system kernel, kernel extensions, and most device drivers. To open sockets, a server typically must use user mode and kernel mode.

Kernel mode is a privileged mode of the CPU in which only the kernel runs and which provides access to all memory locations and all other system resources. Operating systems are typically the only applications that run in kernel mode. Other applications initially operate in user mode, but they can run portions of the kernel code via system calls. The existence of these two modes in operating systems means that an operation is necessary when a system call causes the CPU to shift from user mode to kernel mode. This is referred to as a mode switch. A mode transition is not equivalent to a context switch, however, a context switch typically takes place when switching modes.

A context switch is the process of storing the state of a process or thread, so that it can be restored and resume execution at a later point. This allows multiple processes to share a single CPU and is an essential feature of a multi-tasking operating system.

Context switching is generally computationally intensive. That is, it requires considerable processor time, which can be on the order of nanoseconds for each of the tens or hundreds of switches per second. Thus, context switching represents a substantial cost to the system in terms of CPU time and can, in fact, be one of the most costly operation on an operating system. For instance, a context switch might take anywhere from a few 100 nanoseconds to few microseconds depending upon the CPU architecture and the size of the context that is to be saved and restored.

With every socket created by a user space application, there is a corresponding data structure created in the kernel. Accordingly, creation of a socket and writing to a socket requires multiple mode switches and context switches, which can be quite costly.

In writing and transmitting data via sockets, multiple buffers are involved in order to control the flow of data. Typically, in streaming to multiple devices concurrently, there is a sliding window buffer of data for each TCP connection as well as a ring buffer. Writing to a buffer in user space and copying data to kernel space requires mode switches and context switch that may be inefficient, especially if there is a need to switch modes for each streaming connection.

A server device may divide the media asset into a plurality of portions. A portion may be a "segment" of the media asset comprising a number of seconds of audio and/or video data and may be the minimum amount of data which can be played back by a client device. Alternatively, a portion may be a "chunk" of a segment, which contains a small amount of data that, when combined with other chunks, forms a segment for playback. For example, a server may divide the media asset into a plurality of segments, each representing a number of seconds of media content. A server device may further divide each segment into a plurality of chunks, each comprising a small amount of data from a given segment. The server device receives a request from a client device for content to be streamed.

For example, when a client wants to consume streaming content, e.g., audio or video, the client may initiates a TCP connection to a streaming server. The client and server exchange information and challenges/responses until the server authorizes the client. The server then initiates a data stream connection to the client and begins sending streaming data in chunks to the client. Chunks, for instance, are typically sized, e.g., 512 kB to 2 MB.

Generally, these chunks are copied multiple times to buffers in the TCP/IP stack when delivering a stream. When a streaming application calls for a "write" operation (in user space) at a server, the application copies data from a transcoder output buffer into the kernel buffer corresponding to the client device. Subsequently, the kernel will copy the data from the write buffer into the network interface and send the data. The server has to copy from the transcoder output buffer to the kernel write buffer to the network interface for each streaming client device. Moreover, such an application must switch between user mode and kernel mode for, at least, the copying from transcoder output buffer to the kernel write buffer at least once for each streaming client device.

In some embodiments disclosed herein, a server may stream content to multiple devices from a single shared buffer in kernel space, thereby reducing buffer resource use and minimizing context/mode switching between kernel space and user space. For example, concurrent streaming sessions may be seen, e.g., as a live multimedia stream. If a live video is being transmitted as a multicast stream to many devices, rather than each device having a corresponding sliding window buffer in kernel space, each device will share a single shared sliding buffer in kernel space. The sliding window buffer size will be at least large enough to stream the slowest connection speed and can be, e.g., multiple times as large as necessary, in case of the issues beyond the worst-case scenario. The computing device then transmits chunks of the content from the shared sliding window buffer to each of the plurality of client devices.

With the increased use of live streaming and millions of users accessing content simultaneously, scalability of a streaming server can be a major bottle neck. Memory and performance constraints may cause a poor user experience and high cost in current multiuser streaming server. The proposed solutions for the memory and processing issues discussed above involve adapting the kernel and the network stack. Concurrent streaming may be optimized by moving a significant portion of the processing from the user space to the kernel space. Reducing and/or avoiding extra context switches between user space and kernel space may minimize time lost to switching modes and/or contexts. Reducing the number of buffers used and copying required may further minimize burdens on processors and memory in concurrent streaming.

It should be noted that the methods and systems described herein for one embodiment may be combined with other embodiments as discussed herein. It should be emphasized that the term "comprises/comprising" when used in this specification specifies the presence of stated features, steps or components, but does not preclude other features, steps, components or groups thereof.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
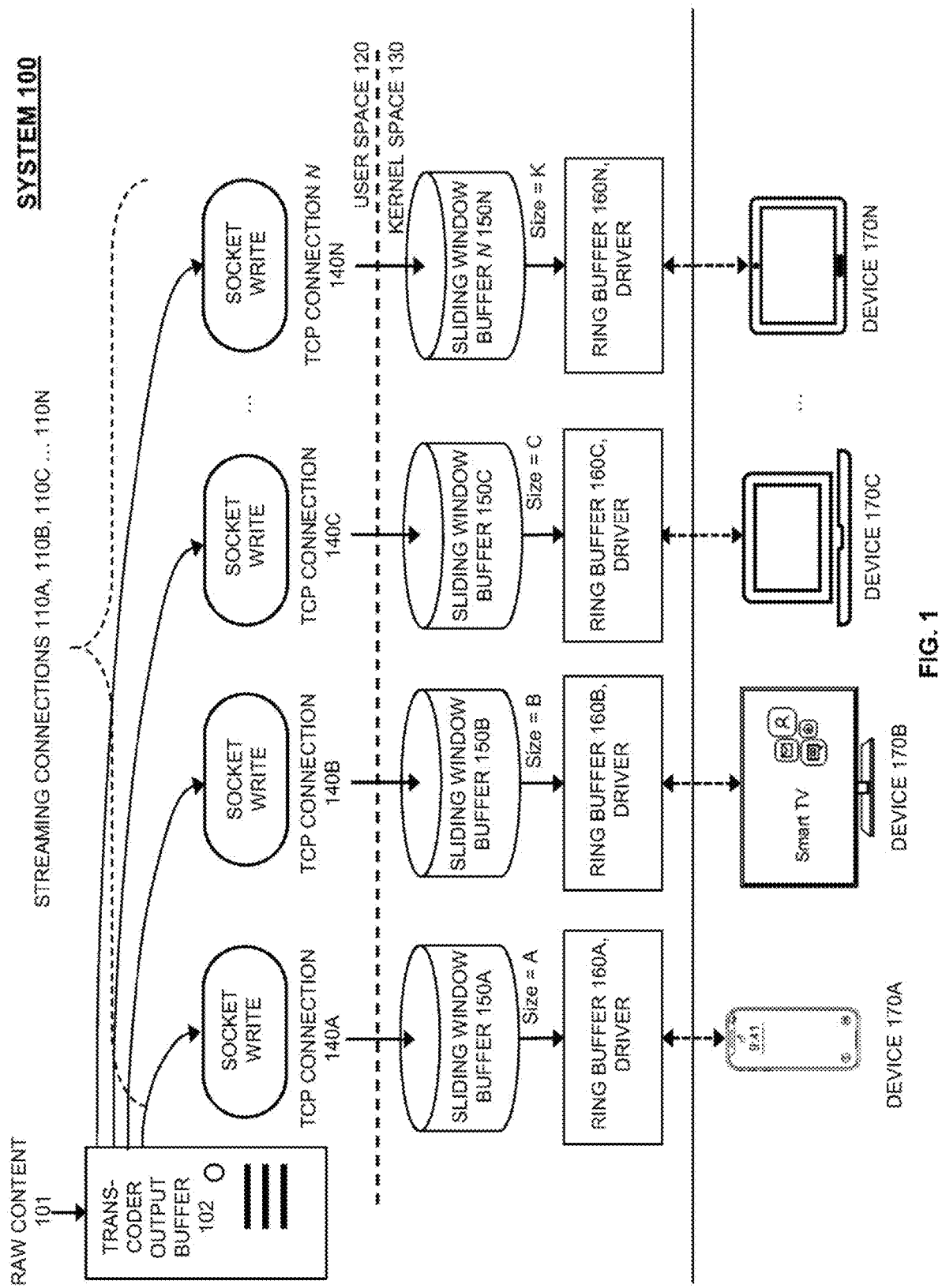
FIG. 1 shows block diagram of an illustrative process flow for concurrent streaming using multiple separate sliding window buffers in a system.

FIG. 1 shows a block diagram of an illustrative process flow for concurrent streaming using multiple separate sliding window buffers in a system 100. System 100 depicts a content delivery system delivering content, over steaming connections 110A-N, to a plurality of devices (e.g., client devices 170A-N) via TCP connections 140A-N, respectively. Some approaches utilize a streaming engine, e.g., as part of a streaming application, stored and executed by one or more of the processors and memory of a device or server to deliver content. In system 100, the streaming engine operates in user space but has the ability to call on kernel operations.

In system 100, a transcoder (or encoder) converts raw content data 101 to encoded content (for compression) and writes to an output buffer, e.g., transcoder output buffer 102. Transcoder output buffer 102 stores data that will be transmitted to all the client devices 170A-N. In system 100, the streaming engine creates a socket per connection, e.g., one socket for every device to which data is streamed, as TCP connection 140A-N (in user space 120). Each of TCP connection 140A-N has an associated TCP socket buffer. The data from the transcoder output buffer 102 is written to each TCP socket buffer in multiple chunks for every connected client.

For instance, assuming a complete buffer is 10 GB of data and there are 1,000 connections, then the 10 GB of data may be split into chunks of a few megabytes or hundred kilobytes. Then, for each connection, the chunks are written to the socket. If the chunks are 512 kilobytes each, then 10 GB would generate 20,000 chunks. 20,000 chunks going to each of 1,000 connections would be 20 million total chunks sent.

In system 100, TCP data transmission follows a sliding window protocol to ensure that no data is lost. For instance, there is a sliding window buffer 150A-N maintained by the kernel (e.g., in kernel space 130) for each of TCP connection 140A-N. With the exemplary 1,000 connections, there would be, e.g., 1000 sliding window buffers. The size of each sliding window buffer may be configurable and can run up to hundreds of megabytes. For instance, in system 100, sliding window buffer 150A has a size of "A," sliding window buffer 150B has a size of "B," sliding window buffer 150C has a size of "C," and sliding window buffer 150N has a size of "K."

In system 100, the data that was written to the socket buffer of each of TCP connection 140A-N (in user space 120) is copied to a corresponding sliding window buffer 150A-N (in kernel space 130) in chunks. Such an operation requires significant processing and memory resources considering that this copy involves a user-space-to-kernel-space mode switch. Such a costly copy happens for each connection, for all the data. In the example with 1,000 connections, the streaming engine would transmit 10 terabytes (e.g., 10 GB×1000), in chunks until all data is transmitted.

In system 100, the kernel copies from each sliding window buffer 150A-N and forwards the data to a corresponding ring buffer 160A-N. From each of ring buffer 160A-N, the data is pushed to client devices 170A-N.

There are several potential issues with the approaches system 100. For instance, the approaches of system 100 may unduly burden the processor(s) and memory. In system 100, data from transcoder output buffer 102 is written to each TCP socket buffer in multiple chunks for every connected client, in user space. If there are hundreds or thousands of open sockets, the streaming engine copying chunks to the socket buffer may be excessive.

System 100 also includes a sliding window buffer 150A-N for each of TCP connection 140A-N, which is maintained by the kernel (e.g., in kernel space 130). Having a sliding window buffer 150A-N for each of TCP connection 140A-N, each with a copy of chunks of content to be streamed, may be redundant and burdensome of memory as well. Copying chunks multiple times to each socket buffer, and then copying to each sliding window buffer 150A-N may include a suboptimal amount of mode switches between user mode and kernel mode, as well as burdening the processor(s). Additionally, an application including a streaming engine of system 100 may be running in user space and could create unnecessary mode switches. There exists a need to improve upon the streaming engine of system 100.

Figure 2:
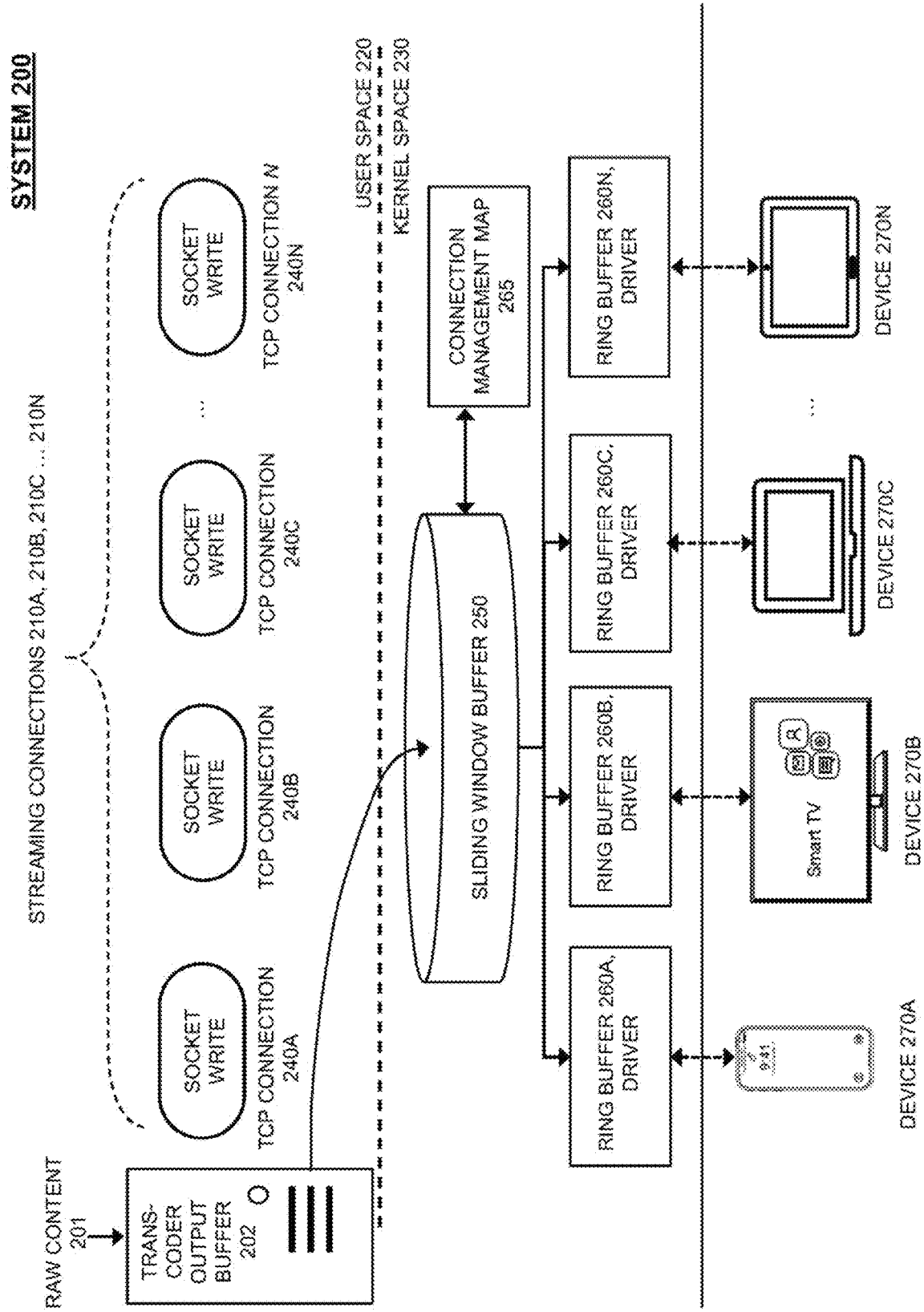
FIG. 2 shows block diagram of an illustrative process flow for concurrent streaming using a shared sliding window buffer, in accordance with some embodiments of the disclosure.

FIG. 2 shows block diagram of an illustrative process flow for concurrent streaming using a shared sliding window buffer in a system 200, in accordance with some embodiments of the disclosure. System 200 depicts a content delivery system delivering content, over steaming connections 210A-N, to a plurality of devices (e.g., client devices 270A-N) via TCP connections 240A-N, respectively. Some embodiments may utilize a concurrent streaming engine, e.g., as part of concurrent streaming application, stored and executed by one or more of the processors and memory of a device or server to deliver content. In some embodiments, a concurrent streaming engine may be incorporated as part of an operating system as, e.g., the concurrent streaming engine performs tasks in kernel space.

In system 200, a transcoder (or encoder) converts raw content data 201 to encoded content (for compression) and writes to an output buffer, e.g., transcoder output buffer 202. Transcoder output buffer 202 stores data that will be transmitted to all the client devices 270A-N. In system 200, streaming engine creates a socket per connection, e.g., one socket for every device to which data is streamed, as TCP connection 240A-N (in user space 220).

In system 200, sliding window buffer 250 is a single shared buffer to manage segments for all TCP connection 240A-N. System 200 differs from system 100. As explained above, in system 100 the data from the transcoder output buffer 102 is written to separate individual TCP socket buffers, one for each of TCP connection 140A-N. System 200, for instance, uses a sliding window buffer 250 to transmit the same data for each connection rather than having individual buffers for each of TCP connection 240A-N. In some embodiments, the size of sliding window buffer 250 is based on assuming the worst-case size of what individual buffers would be. For example, the size of sliding window buffer 250 may be a multiple of (e.g., twice or one-and-a-half times) the worst-case scenario, e.g., the slowest connection. With system 200 using a sliding window buffer 250, memory may be conserved, and multiple data copies may be minimized.

In some embodiments, connection management map 265 may be implemented as a map in kernel space 230 (or user space 220) to store connection data such as connection specific parameters, data transmitted to each device, and other information. In some embodiments, connection management map 265 may initiate creation of sliding window buffer 250, e.g., on receipt of the first connection request. In some embodiments, connection management map 265 may manage the life cycle of sliding window buffer 250 in kernel space 230. For example, connection management map 265 may be configured to remove chunks of content from the sliding window buffer 250 once the chunks of content have been served to all connected client devices 270A-N.

In system 200, the kernel copies from the sliding window buffer 250 and forwards the data to ring buffers 260A-N corresponding to each of client devices 270A-N. From each of the ring buffers 260A-N, the data is pushed to respective client devices 270A-N.

Figure 3:
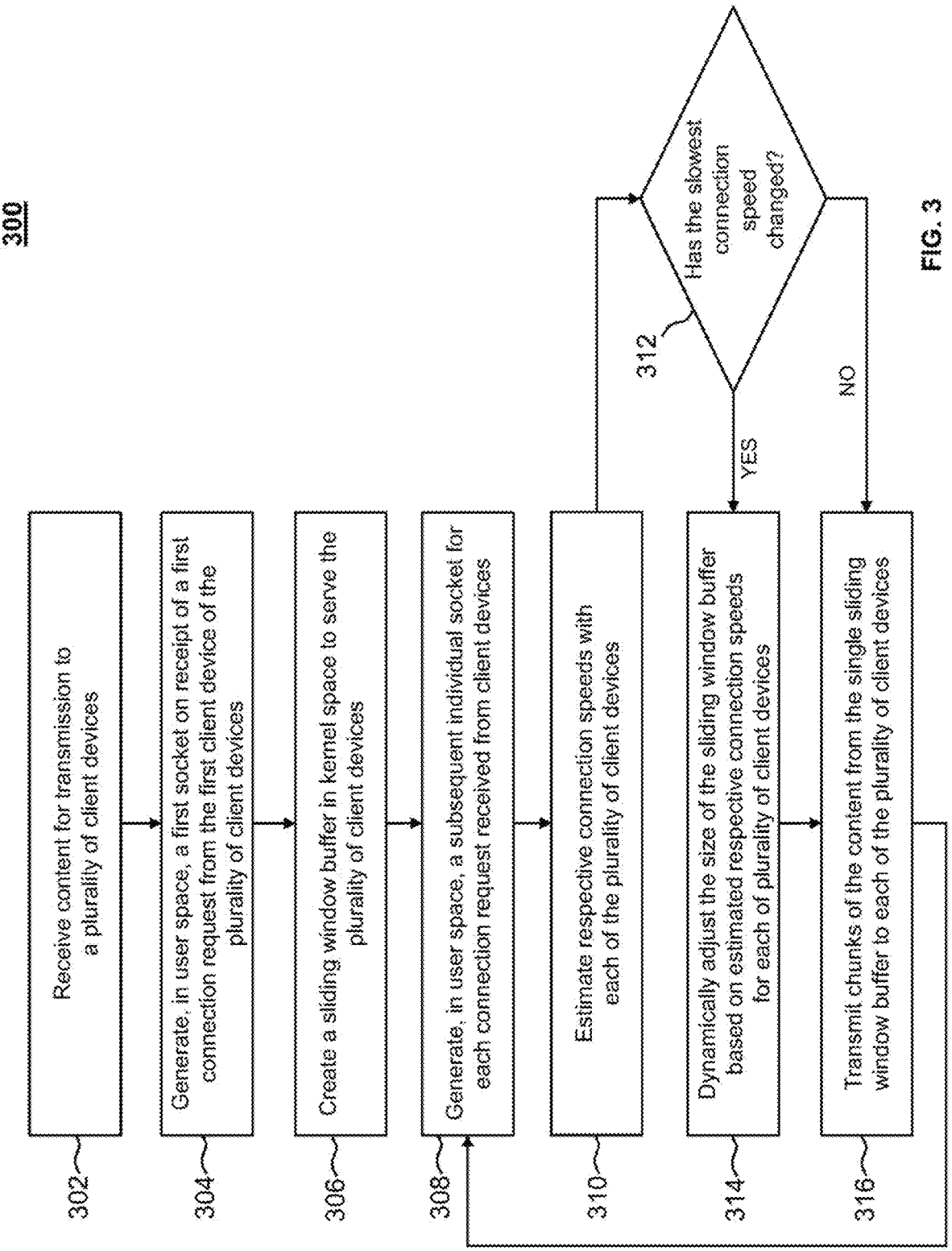
FIG. 3 is an illustrative flowchart of a process for concurrent streaming using a shared sliding window buffer, in accordance with some embodiments of the disclosure.

FIG. 3 is an illustrative flowchart of a process 300 for concurrent streaming using a shared sliding window buffer, in accordance with some embodiments of the disclosure. Some embodiments may include, for instance, a concurrent stream engine, e.g., as part of an interactive content guidance application, carrying out the steps of process 300 depicted in the flowchart of FIG. 3. In some embodiments, each step of process 300 may be performed by control circuitry 404 (e.g., in a manner instructed to control circuitry 404 by the content delivery application) or any of the system components shown in FIG. 4. In some embodiments, each step of process 300 may be performed by control circuitry 504 (e.g., in a manner instructed to control circuitry 504 by the content delivery application) or any of the system components shown in FIG. 5.

At step 302, a concurrent stream engine receives content for transmission to a plurality of client devices. In some embodiments, such as system 200 illustrated in FIG. 2, the content may be raw content 201 transcoded and/or compressed and stored in an out buffer, e.g., transcoder output buffer 202.

At step 304, the concurrent stream engine generates, in user space, a first socket on receipt of a first connection request from the first client device of the plurality of client devices. For example, in system 200, TCP connection 240A may be a socket connection for, e.g., streaming connection 210A.

At step 306, the concurrent stream engine creates a sliding window buffer in kernel space to serve the plurality of client devices. In system 200, for example, sliding window buffer 250 is created in kernel space 230. In some embodiments a sliding window buffer, or any buffer, may be found as part of a computing unit's memory or storage. In some embodiments, connection management map 265 may be implemented as a map stored in kernel space 230 (or user space 220) of memory and used to store connection data such as connection specific parameters, data transmitted to each device, and other information. In some embodiments, connection management map 265 may initiate creation of sliding window buffer 250, e.g., on receipt of the first connection request.

At step 308, the concurrent stream engine, generates, in user space, a subsequent individual socket for each connection request received from the plurality of client devices. In system 200, for example, steaming connections 210B-N would each require TCP connections 240B-N, respectively.

At step 310, the concurrent stream engine estimates respective connection speed between the computing device and each of plurality of client devices. In system 200, for example, steaming connections 210A-N would each be measured. In some embodiments, the concurrent stream engine may measure respective Quality of service (QoS) in the connections between the computing device and each of plurality of client devices. Quality of service (QoS) may refer to any technology that manages data traffic to reduce packet loss, latency and jitter on the network. Measurements of QoS may include, average throughput, minimum download speed, and others. Level of connection performance may also be measured, for example via measurements of bit rate, latency, and/or bit error rate. Connection speed may be estimated and/or adjusted based on measured QoS and/or level of performance.

At step 312, the concurrent stream engine compares the respective connection speed estimates between the concurrent stream engine and each of the plurality of client devices and determines whether the slowest connection speed changed. For instance, system 200 may determine streaming connection 210C, of system 200, is estimated to be slower than streaming connection 210A and system 200 must adjust.

If the slowest connection speed changed then, at step 314, the concurrent stream engine dynamically adjusts the size of the sliding window buffer based on estimated respective connection speed between the computing device and each of plurality of client devices. For instance, system 200 may determine streaming connection 210C, of system 200, is estimated to be slower than streaming connection 210A and, thus, sliding window buffer 250 must be adjusted accordingly. In some embodiments, if the detected speed is substantially slower than the rest of the streaming connections or is too slow to stream at the desired quality, then the connection may be dropped from the group and re-grouped (or dropped entirely).

After the size of the sliding window buffer is adjusted in step 314 or if the slowest connection speed did not change, at step 316, the concurrent stream engine transmits chunks of the content from the shared sliding window buffer to each of the plurality of client devices. In system 200, the kernel copies from the sliding window buffer 250 and forwards the data to ring buffers 260A-N corresponding to each of client devices 270A-N.

After (or while) the chunks are transmitted, the concurrent stream engine checks for additional connection requests and, e.g., begins the process again at step 308 if there are new connections and/or additional content to transmit. In system 200, the kernel pushes data from each of the ring buffers 260A-N, to respective client devices 270A-N before a new TCP connection, such as TCP connections 240B-N is opened and the kernel copies data from the sliding window buffer 250 and forwards the data to ring buffers 260A-N.

Figure 4:
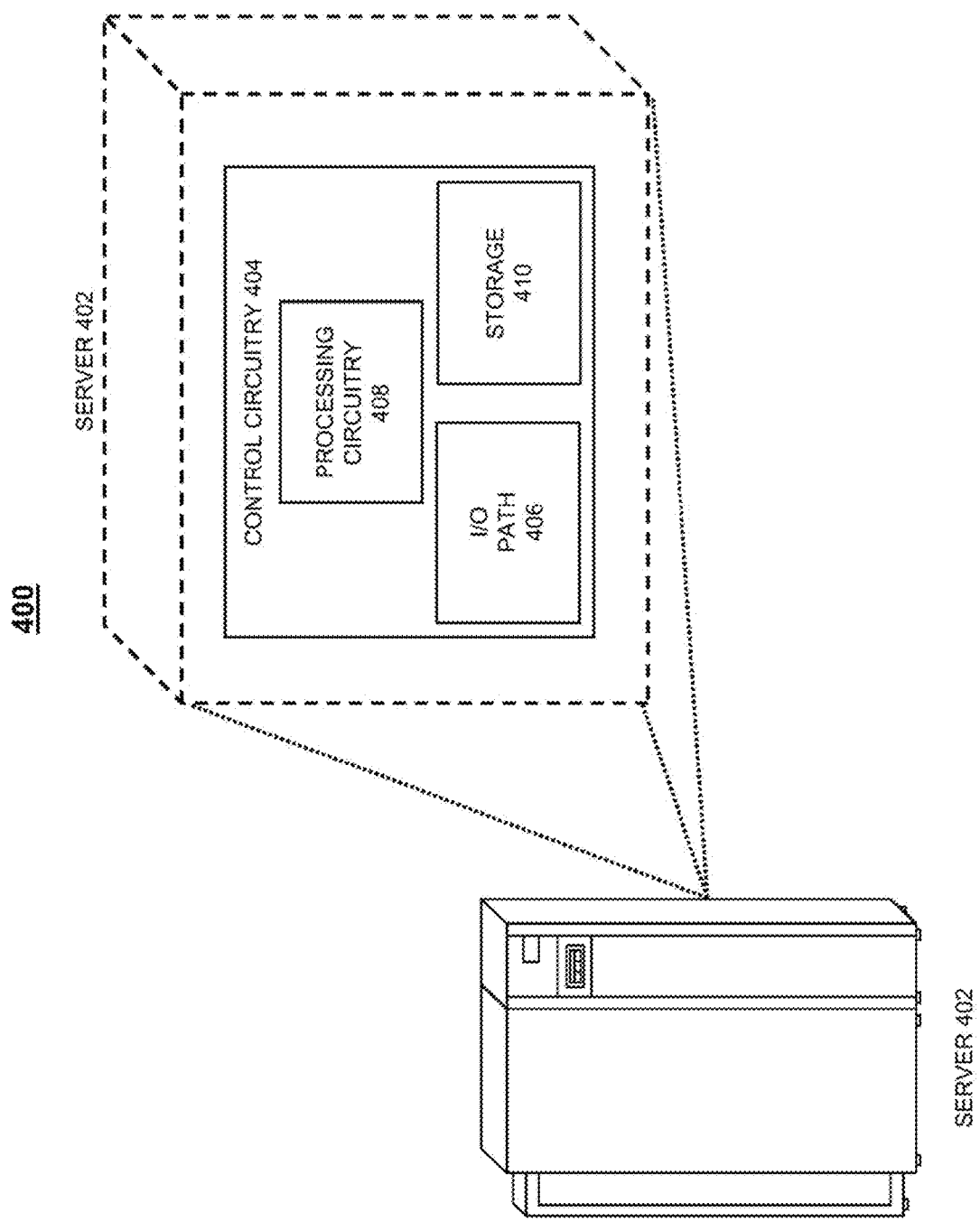
FIG. 4 shows an illustrative block diagram of a server, in accordance with some embodiments of the disclosure.

FIG. 4 shows an illustrative block diagram 400 of server 402, in accordance with some embodiments of the disclosure. In some embodiments, server 402 may be communicatively connected to a user interface. In some embodiments, server 402 may include processing circuitry, control circuitry, and storage (e.g., RAM, ROM, hard disk, removable disk, etc.). Server 402 may include an input/output path 406. I/O path 406 may provide device information, or other data, over a local area network (LAN) or wide area network (WAN), and/or other content and data to control circuitry 404, that includes processing circuitry 408 and storage 410. Control circuitry 404 may be used to send and receive commands, requests, signals (digital and analog), and other suitable data using I/O path 406. I/O path 406 may connect control circuitry 404 (and specifically processing circuitry 408) to one or more communications paths.

Control circuitry 404 may be based on any suitable processing circuitry such as processing circuitry 408. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g. two Intel Core i7 processors) or multiple different processors (e.g., an Intel Core i5 processor and an Intel Core i7 processor). In some embodiments, control circuitry 404 executes instructions for server 402 stored in memory (e.g., storage 410).

Memory may be an electronic storage device provided as storage 410, which is part of control circuitry 404. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions). Storage 410 may be sub-divided into different spaces such as kernel space and user space. Kernel space is a portion of memory or storage that is, e.g., reserved for running a privileged operating system kernel, kernel extensions, and most device drivers. User space may be considered an area of memory or storage where application software generally executes and is kept separate from kernel space so as to not interfere with system-vital processes. Kernel mode may be considered as a mode when control circuitry 404 has permission to operate on data in kernel space, while applications running in user mode must request control circuitry 404 to perform tasks in kernel mode on its behalf. Buffers may be stored in memory such as storage 410 and sliding window buffers, such as sliding window buffer 250, may be found in kernel space of such memory.

Server 402 may be coupled to a communications network. The communication network may be one or more networks including the Internet, a mobile phone network, mobile voice or data network (e.g., a 3G, 4G, 5G or LTE network), mesh network, peer-to-peer network, cable network, cable reception (e.g., coaxial), microwave link, DSL reception, cable internet reception, fiber reception, over-the-air infrastructure or other types of communications network or combinations of communications networks. Server 402 may be coupled to a secondary communication network (e.g., Bluetooth, Near Field Communication, service provider proprietary networks, or wired connection) to the selected device for generation for playback. Paths may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths. As described above in FIG. 4, an analogous block diagram would be applicable for a headend server.

Figure 5:
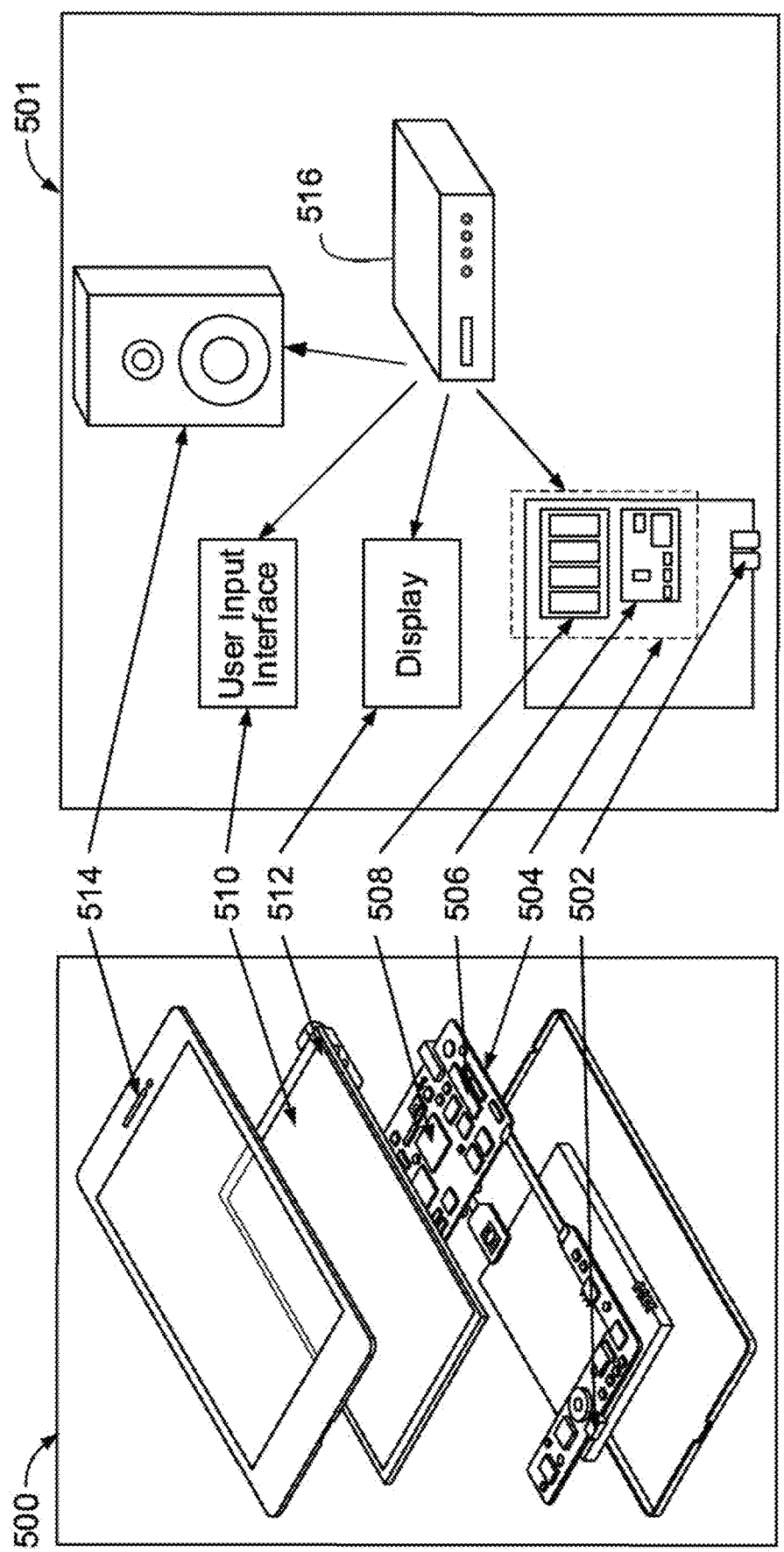
FIG. 5 is a diagram of illustrative devices, in accordance with some embodiments of the disclosure.

FIG. 5 shows a generalized embodiment of illustrative device 500. As referred to herein, device 500 should be understood to mean any device that can receive input from one or more other devices, one or more network-connected devices, one or more electronic devices having a display, or any device that can provide content for consumption. As depicted in FIG. 5, device 500 is a smartphone, however, device 500 is not limited to smartphones and/or may be any computing device. For example, device 500 of FIG. 5 can be in system 600 of FIG. 6 as device 602, including but not limited to a smartphone, a smart television, a tablet, a microphone (e.g., with voice control or a virtual assistant), a computer, or any combination thereof, for example. Device 500 may also work in concert with a server, such as server 402 of FIG. 4, in order to live-stream video by, for example, delivering captured content. Some embodiments may include, for instance, live-streaming of video from a smartphone's camera or live gameplay from a gaming console (e.g., streaming of eSports).

Device 500 may be implemented by a device or system, e.g., a device providing a display to a user, or any other suitable control circuitry configured to generate a display to a user of content. For example, device 500 of FIG. 5 can be implemented as equipment 501. In some embodiments, equipment 501 may include set-top box 516 that includes, or is communicatively coupled to, display 512, audio equipment 514, and user input interface 510. In some embodiments, display 512 may include a television display or a computer display. In some embodiments, user interface input 510 is a remote-control device. Set-top box 516 may include one or more circuit boards. In some embodiments, the one or more circuit boards include processing circuitry, control circuitry, and storage (e.g., RAM, ROM, Hard Disk, Removable Disk, etc.). In some embodiments, circuit boards include an input/output path. Each one of device 500 and equipment 501 may receive content and receive data via input/output (hereinafter "I/O") path 502. I/O path 502 may provide content and receive data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communication paths (described below). I/O functions may be provided by one or more of these communication paths but are shown as a single path in FIG. 5 to avoid overcomplicating the drawing. While set-top box 516 is shown in FIG. 5 for illustration, any suitable computing device having processing circuitry, control circuitry, and storage may be used in accordance with the present disclosure. For example, set-top box 516 may be replaced by, or complemented by, a personal computer (e.g., a notebook, a laptop, a desktop), a smartphone (e.g., device 500), a tablet, a network-based server hosting a user-accessible client device, a non-user-owned device, any other suitable device, or any combination thereof.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for an application concurrent stream engine stored in memory (e.g., storage 508). Specifically, control circuitry 504 may be instructed by the application to perform the functions discussed above and below. For example, the application may provide instructions to control circuitry 504 to generate the content guidance displays. In some implementations, any action performed by control circuitry 504 may be based on instructions received from the application.

In some client/server-based embodiments, control circuitry 504 includes communications circuitry suitable for communicating with an application server. A concurrent stream engine may be a stand-alone application implemented on a device or a server. A concurrent stream engine may be implemented as software or a set of executable instructions. The instructions for performing any of the embodiments discussed herein of the concurrent stream engine may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 5, the instructions may be stored in storage 508, and executed by control circuitry 504 of a device 500.

Figure 6:
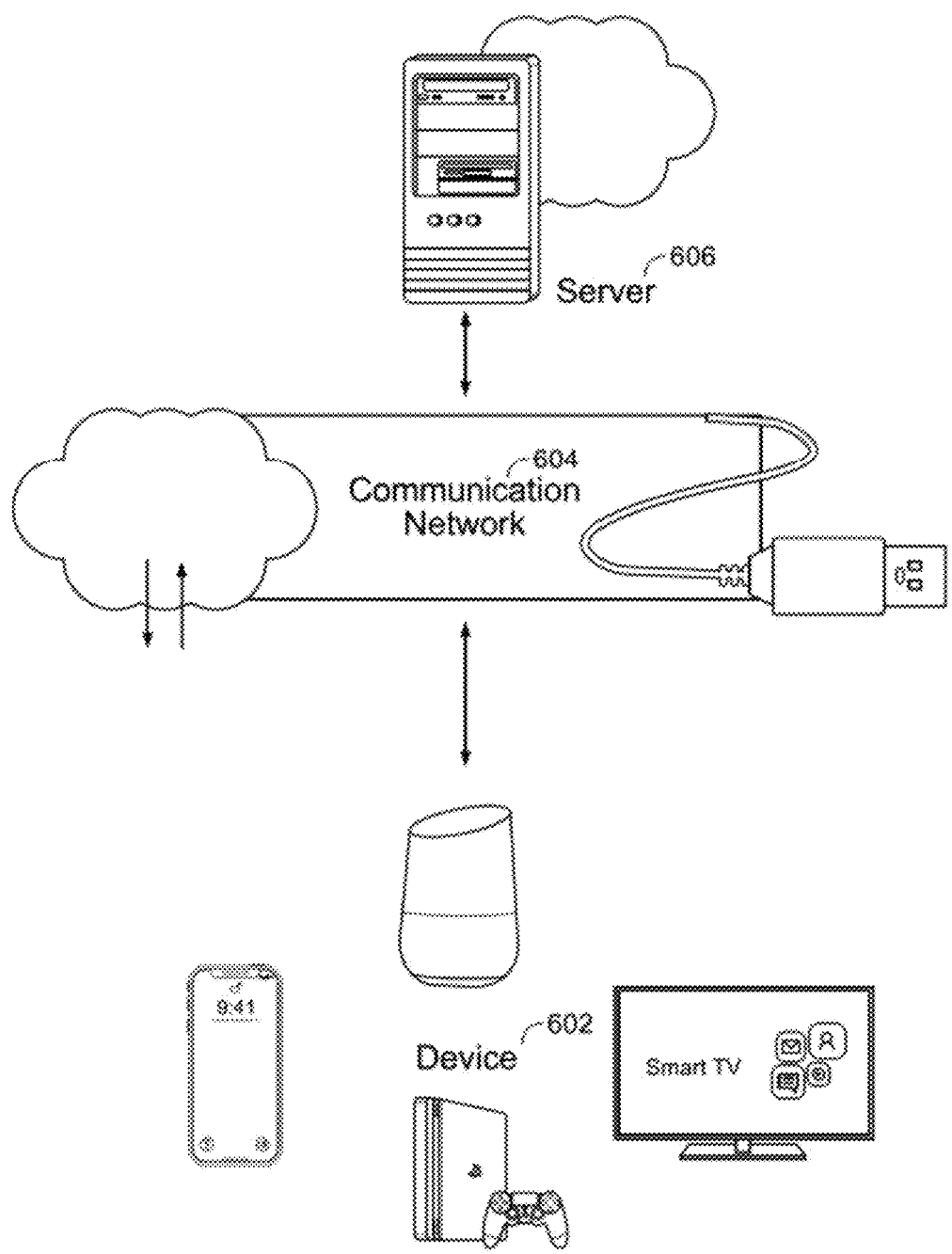
FIG. 6 is a diagram of an illustrative system, in accordance with some embodiments of the disclosure.

In some embodiments, a concurrent stream engine may be a client/server application where only the client application resides on device 500 (e.g., device 602, depicted in FIG. 6), and a server application resides on an external server (e.g., server 606, depicted in FIG. 6, or server 404, depicted in FIG. 4). For example, a concurrent stream engine may be implemented partially as a client application on control circuitry 504 of device 500 and partially on server 606 as a server application running on control circuitry. Server 606 may be a part of a local area network with device 602 or may be part of a cloud computing environment accessed via the internet. In a cloud computing environment, various types of computing services for performing searches on the internet or informational databases, providing storage (e.g., for the keyword-topic database) or parsing data are provided by a collection of network-accessible computing and storage resources (e.g., server 606), referred to as "the cloud." Device 500 may be a cloud client that relies on the cloud computing capabilities from server 606 to determine times, identify one or more content items, and provide content items by the concurrent stream engine. When executed by control circuitry of server 606, the concurrent stream engine may instruct the control circuitry to generate the concurrent stream engine output (e.g., content items and/or indicators) and transmit the generated output to device 602. The client application may instruct control circuitry of the receiving device 602 to generate the concurrent stream engine output. Alternatively, device 602 may perform all computations locally via control circuitry 504 without relying on server 606.

Control circuitry 504 may include communications circuitry suitable for communicating with a concurrent stream engine server, a quotation database server, or other networks or servers. The instructions for carrying out the above-mentioned functionality may be stored and executed on the application server 606. Communications circuitry may include a cable modem, an integrated-services digital network (ISDN) modem, a digital subscriber line (DSL) modem, a telephone modem, an ethernet card, or a wireless modem for communications with other equipment, or any other suitable communications circuitry. Such communications may involve the internet or any other suitable communication network or paths. In addition, communications circuitry may include circuitry that enables peer-to-peer communication of devices, or communication of devices in locations remote from each other.

Memory may be an electronic storage device such as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, or any other suitable fixed or removable storage devices, and/or any combination of the same. Storage 508 may be used to store various types of content described herein as well as content guidance data described above. Nonvolatile memory may also be used (e.g., to launch a boot-up routine and other instructions). Cloud-based storage, for example, (e.g., on server 606) may be used to supplement storage 508 or instead of storage 508.

A user may send instructions to control circuitry 504 using user input interface 510. User input interface 510, display 512 may be any suitable interface such as a touchscreen, touchpad, or stylus and/or may be responsive to external device add-ons, such as a remote control, mouse, trackball, keypad, keyboard, joystick, voice recognition interface, or other user input interfaces. Display 510 may include a touchscreen configured to provide a display and receive haptic input. For example, the touchscreen may be configured to receive haptic input from a finger, a stylus, or both. In some embodiments, equipment device 500 may include a front-facing screen and a rear-facing screen, multiple front screens, or multiple angled screens. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 516.

Audio equipment 510 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Speakers 514 may be provided as integrated with other elements of each one of device 500 and equipment 501 or may be stand-alone units. An audio component of videos and other content displayed on display 512 may be played through speakers of audio equipment 514. In some embodiments, audio may be distributed to a receiver (not shown), which processes and outputs the audio via speakers of audio equipment 514. In some embodiments, for example, control circuitry 504 is configured to provide audio cues to a user, or other audio feedback to a user, using speakers of audio equipment 514. Audio equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504.

An application (e.g., for generating a display) may be implemented using any suitable architecture. For example, a stand-alone application may be wholly implemented on each one of device 500 and equipment 501. In some such embodiments, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 504 may allow a user to provide user profile information or may automatically compile user profile information. For example, control circuitry 504 may monitor the words the user inputs in his/her messages for keywords and topics. In some embodiments, control circuitry 504 monitors user inputs such as texts, calls, conversation audio, social media posts, etc., to detect keywords and topics. Control circuitry 504 may store the detected input terms in a keyword-topic database and the keyword-topic database may be linked to the user profile. Additionally, control circuitry 504 may obtain all or part of other user profiles that are related to a particular user (e.g., via social media networks), and/or obtain information about the user from other sources that control circuitry 504 may access. As a result, a user can be provided with a unified experience across the user's different devices.

In some embodiments, the application is a client/server-based application. Data for use by a thick or thin client implemented on each one of device 500 and equipment 501 is retrieved on-demand by issuing requests to a server remote from each one of device 500 and equipment 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on device 500. Device 500 may receive inputs from the user via input interface 510 and transmit those inputs to the remote server for processing and generating the corresponding displays. For example, device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to device 500 for presentation to the user.

As depicted in FIG. 6, device 602 may be coupled to communication network 604. Communication network 604 may be one or more networks including the internet, a mobile phone network, mobile voice or data network (e.g., a 4G or LTE network), cable network, public switched telephone network, Bluetooth, or other types of communication network or combinations of communication networks. Thus, device 602 may communicate with server 606 over communication network 604 via communications circuitry described above. In should be noted that there may be more than one server 606, but only one is shown in FIG. 6 to avoid overcomplicating the drawing. The arrows connecting the respective device(s) and server(s) represent communication paths, which may include a satellite path, a fiber-optic path, a cable path, a path that supports internet communications (e.g., IPTV), free-space connections (e.g., for broadcast or other wireless signals), or any other suitable wired or wireless communications path or combination of such paths.

In some embodiments, the application is downloaded and interpreted or otherwise run by an interpreter or virtual machine (e.g., run by control circuitry 504). In some embodiments, the application may be encoded in the ETV Binary Interchange Format (EBIF), received by control circuitry 504 as part of a suitable feed, and interpreted by a user agent running on control circuitry 504. For example, the application may be an EBIF application. In some embodiments, the application may be defined by a series of JAVA-based files that are received and run by a local virtual machine or other suitable middleware executed by control circuitry 504.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of streaming content to multiple devices from shared buffer memory, the method comprising:
   accessing, by a server, content for transmission to a plurality of client devices;
   receiving a first connection request from a first device of the plurality of client devices;
   in response to receiving the first connection request, establishing a first connection between the first device and the server using a first part of memory;
   receiving a second connection request from a second device of the plurality of client devices;
   in response to receiving the second connection request, establishing a second connection between the second device and the server using the first part of memory;
   creating a shared buffer for the content in a second part of memory;
   determining, at the server, connection speed data for each of the first connection and the second connection;
   dynamically adjusting a size of the shared buffer based on the connection speed data for each of the first connection and the second connection; and
   transmitting, by the server, the content from the shared buffer to each of the plurality of client devices.

2. The method of claim 1, wherein the creating of the shared buffer is triggered by a connection management map after receipt of the first connection request.

3. The method of claim 2, wherein the connection management map manages a life cycle of the shared buffer in kernel space.

4. The method of claim 3, wherein the connection management map is configured to remove a chunk of content from the shared buffer once the chunk of content is served to all connected devices of the plurality of client devices.

5. The method of claim 1, wherein the content is a live multimedia stream.

6. The method of claim 5, wherein an encoding of the content is one of MPEG-DASH, HTTP Dynamic streaming, HTTP Live Streaming (HLS), or Smooth Streaming.

7. The method of claim 1, wherein transmitting includes copying to a ring buffer corresponding to each device prior to transmitting.

8. The method of claim 1, wherein the first part of memory is user space and the second part of memory is kernel space.

9. The method of claim 1, wherein the connection speed data of the second connection is at least half as fast as the connection speed data of the first connection and the shared buffer is dynamically adjusted based on the slower connection speed data.

10. The method of claim 1, wherein the connection speed data of the second connection is at least twice as fast as the connection speed data of the first connection and the shared buffer is dynamically adjusted based on the slower connection speed data.

11. A system for streaming content to multiple devices from a shared buffer, the system comprising:
first input/output circuitry configured to:
   access content for transmission to a plurality of client devices;
   receive a first connection request from a first device of the plurality of client devices; and
   receive a second connection request from a second device of the plurality of client devices;
memory comprising:
   a first part of memory; and
   a second part of memory;
processing circuitry configured to:
   establish, in response to receiving the first connection request, a first connection to the first device in the first part of memory;
   establish, in response to receiving the second connection request, a second connection to the second device in the first part of memory;
   create a shared buffer for the content in the second part of memory;
   determine connection speed data for each of the first connection and the second connection; and
   dynamically adjust a size of the shared buffer based on the connection speed data for each of the first connection and the second connection; and
second input/output circuitry configured to transmit the content from the shared buffer to each of the plurality of client devices.

12. The system of claim 11, wherein the processing circuitry is further configured to create the shared buffer, triggered by a connection management map on receipt of the first connection request.

13. The system of claim 12, wherein the connection management map manages a life cycle of the shared buffer in kernel space.

14. The system of claim 13, wherein the connection management map is configured to remove a chunk of content from the shared buffer once the chunk of content is served to all connected devices of the plurality of client devices.

15. The system of claim 11, wherein the content is a live multimedia stream.

16. The system of claim 15, wherein an encoding of the content is one of MPEG-DASH, HTTP Dynamic streaming, HTTP Live Streaming (HLS), or Smooth Streaming.

17. The system of claim 11, wherein the second input/output circuitry is further configured to include copying to a ring buffer corresponding to each device prior to transmitting.

18. The system of claim 11, wherein the first part of memory is user space and the second part of memory is kernel space.

19. The system of claim 11, wherein the connection speed data of the second connection is at least half as fast as the connection speed data of the first connection and the shared buffer is dynamically adjusted based on the slower connection speed data.

20. The system of claim 11, wherein the connection speed data of the second connection is at least twice as fast as the connection speed data of the first connection and the shared buffer is dynamically adjusted based on the slower connection speed data.

* * * * *